(12) United States Patent
Hasegawa et al.

(10) Patent No.: US 10,229,718 B1
(45) Date of Patent: Mar. 12, 2019

(54) SHORTENING THE AVERAGE REPOSITION TIME TO THE BEGINNING OF FILES IN A MAGNETIC TAPE

(71) Applicant: INTERNATIONAL BUSINESS MACHINES CORPORATION, Armonk, NY (US)

(72) Inventors: Tohru Hasegawa, Tokyo (JP); Hiroshi Itagaki, Yokohama (JP); Sosuke Matsui, Tokyo (JP); Shinsuke Mitsuma, Machida (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/000,391

(22) Filed: Jun. 5, 2018

(51) Int. Cl.
*G11B 15/093* (2006.01)
*G11B 5/55* (2006.01)
*G11B 27/10* (2006.01)
*G11B 20/10* (2006.01)

(52) U.S. Cl.
CPC .......... *G11B 27/107* (2013.01); *G11B 5/5513* (2013.01); *G11B 2020/10916* (2013.01)

(58) Field of Classification Search
CPC ....... G11B 15/093; G11B 19/28; G11B 15/46; G11B 15/442; G11B 5/5547
See application file for complete search history.

(56) References Cited

U.S. PATENT DOCUMENTS

| 8,537,490 | B2 | 9/2013 | Katagiri et al. |
| 8,908,314 | B2* | 12/2014 | McCallister ........... G11B 15/32 360/73.05 |
| 9,343,111 | B2 | 5/2016 | Katagiri et al. |
| 2016/0139824 | A1 | 5/2016 | Hasegawa et al. |
| 2017/0046077 | A1 | 2/2017 | Whitney |
| 2018/0075027 | A1 | 3/2018 | Abe et al. |

OTHER PUBLICATIONS

Snia, "Linear Tape File System (LTFS) Format Specification", https://www.snia.org/tech_activities/standards/curr_standards/ltfs, printed Jun. 4, 2018, pp. 1-5.
Jeita et al., "Servo Technology Enabling High Recording Density", Tape Storage Experts Committee / Tape System Technical Document, Chapter 6, printed Jun. 4, 2018, pp. 1-16.

* cited by examiner

*Primary Examiner* — Nabil Z Hindi
(74) *Attorney, Agent, or Firm* — Dmitry Paskalov

(57) ABSTRACT

A system accesses metadata on a file system of the magnetic tape, where the metadata comprising one or more fields enabling to determine a longitudinal position (LPOS) of one or more files located on the magnetic tape. The system determines the LPOS of the one or more files located on the magnetic tape. The system determines an optimal location of the head on the magnetic tape based on computing an average value to the determined LPOS of the one or more files located on the magnetic tape and moves the head on the magnetic tape to the optimal location.

20 Claims, 6 Drawing Sheets

```
                    162
<file>
                         164
<fileuid>6</fileuid>
                                  166
<name>binary_file2.bin</name>
                            168
<length>825008</length>
                              170
<readonly>false</readonly>                                        172
<creationtime>2010-02-16T19:13:46.512350773Z</creationtime>
<changetime>2010-02-16T19:13:46.513510263Z</changetime>
<modifytime>2010-02-16T19:13:46.513510263Z</modifytime>
<accesstime>2010-02-16T19:13:46.000000000Z</accesstime>
<backuptime>2010-02-16T19:13:46.512350773Z</backuptime>
<extentinfo>
<extent>                174
<partition>b</partition>
                              176
<startblock>8</startblock>
                            178
<byteoffset>0</byteoffset>
                                180
<bytecount>825008</bytecount>
                          182
<fileoffset>0</fileoffset>
</extent>
</extentinfo>
</file>
```

FIG. 1D

SHORTENING THE AVERAGE REPOSITION TIME TO THE BEGINNING OF FILES IN A MAGNETIC TAPE

BACKGROUND

The present invention relates generally to the field of magnetic tape data access, and more particularly to shortening the average reposition time to the beginning of existing files in a magnetic tape.

Magnetic tape ("tape") data storage systems are widely used to store digital data. Tape data storage systems provide increased data storage space and longevity, for reduced costs. Modern magnetic tapes are commonly packaged in tape cartridges or cassettes. A tape appliance or a tape drive is a device that performs writing or reading of digital data from the tape.

Digital data may be written on tapes of different lengths and widths. One of the standards that defines tape properties is a LINEAR TAPE OPEN® (LTO®) standard (Linear Tape Open and LTO and all LTO based trademarks and logos are trademarks or registered trademarks of Hewlett Packard Enterprise, IBM and Quantum and/or their affiliates). The LTO standard defines a raw data capacity, tape partitioning, and speed of reading of uncompressed data. For example, LTO-7 is capable of writing six terabytes of data to a 3150 ft (960 meter) tape with an average speed of 300 MB/Sec.

Tape partitioning is a creation of one or more regions (data bands) on a magnetic tape so that an operating system may manage the data in each region of the tape separately. One of the partitioning standards that was adopted by the LTO is a Linear Tape File System (LTFS). The LTFS standard formats a tape in a special way that allows to access all recorded files metadata first and therefore see the files and directories on the tape directly after mounting of the tape cartridge. In addition, due to LTFS standard being adopted by all operating systems, the files can be viewed by the operating system without any additional software and can be accessed and used as if it is a hard disk drive (HDD) or a removable flash drive file system, such as, for example, allowing the user to manage and store files in folders (directories), copy, rename and delete files, use drag and drop and copy and paste functionality without waiting while the tape appliance is reading all the data recorded on the tape.

The LTFS format defines at least two partitions on a tape that comprise a data band. One partition, known as an Index Partition (IP), is used to store the metadata of all the files and folders (henceforth "file", "files") recorded on a tape. The other partition is Data Partition (DP), where all the content of the files are stored including files body and files metadata. In LTFS standard, file content is appended to the end of the tape (free space) and deleted files do not' typically, free up space on the tape.

SUMMARY

Embodiments of the present invention provide a system, method, and computer program product for shortening a reposition time of a head on a magnetic tape. A system accesses metadata on a file system of the magnetic tape, where the metadata comprising one or more fields enabling to determine a longitudinal position (LPOS) of one or more files located on the magnetic tape. The system determines the LPOS of the one or more files located on the magnetic tape. The system determines an optimal location of the head on the magnetic tape based on computing an average value to the determined LPOS of the one or more files located on the magnetic tape and moves the head on the magnetic tape to the optimal location.

BRIEF DESCRIPTION OF THE DRAWINGS

FIG. 1D illustrates an example of an index of the file from the LTFS metadata, in accordance with an embodiment of the present invention;

DETAILED DESCRIPTION

Aspects of the present invention, as appreciated by one skilled in the art, may be embodied as a system, method, or computer product. Accordingly, aspects of the present invention may take the form of an embodiment combining software (including firmware, resident software, micro-code, etc.) and hardware aspects all generally be referred to as a "module", "method" or "system." Furthermore, aspects of the present invention may take the form of a computer program product embodied in one or more computer-readable medium(s) having computer-readable program code/instructions embodied thereon including controllers, microcontrollers or computer processing units.

Various aspects of the present invention are described below with reference to flowchart illustrations and/or block diagrams of methods, apparatus (system) and computer program products. Embodiments of the present invention will now be described in detail with reference to the accompanying Figures.

As previously mentioned, LTO-7 standard is capable of writing six terabytes of data to a 3150 ft (960 meter) tape. Typically, the tape may be divided along its width into four data bands, each band divided into 28 wraps, where up to 112 wraps of data areas are available for data storage in both directions of the tape. A physical location in both directions defined by the length of the tape and expressed in longitudinal position counter (LPOS), where LPOS represent longitudinal position that is used by the servo motors to locate a specific data on the tape. Any new piece of data may be only appended to the tape, thus written to the tape at the next LPOS location of a previously written data.

An average seeking speed to locate a specific data on a tape is around 32.8 ft/sec (10 m/sec), therefore it takes about 96 seconds for a head of a tape drive to move from the beginning to the end of the tape. Assuming the requested file is located in the range between the beginning of the tape to the end of the tape, the average travel time to access is around 32 seconds (⅓ of the 96 seconds). This estimate does not take into account that data is recorded in different directions depending on the wrap, and switching directions and repositioning of the head takes additional time. As such, it may be advantageous to, among other things, implement a system that reduces the travel time of the head in order to locate and read the requested data in a shortest timeframe.

An embodiment of the present invention, provides a system, a method, and a program product for shortening the average reposition time to the beginning of recorded files on a magnetic tape.

Figure 1A:
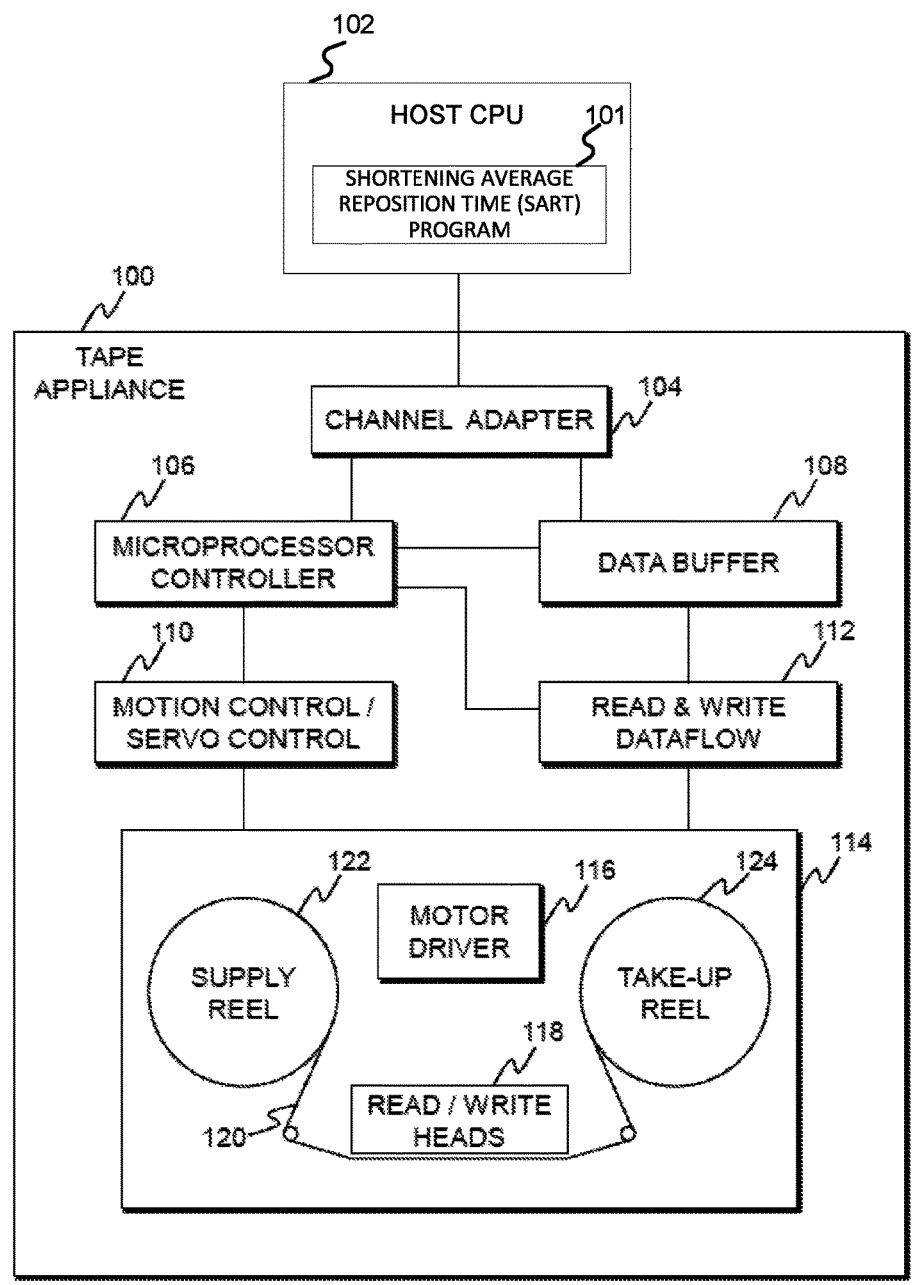
FIG. 1A is a functional block diagram illustrating a system for shortening the average reposition time to the beginning of recorded files in a magnetic tape, in accordance with an embodiment of the present invention.

FIG. 1A is a functional block diagram illustrating a system for shortening the average reposition time to the beginning of files in a magnetic tape. The system may include a tape appliance 100, a host CPU 102 that is connected to the tape appliance 100 and a shortening average reposition time (SART) program that may be executed on the host CPU 102 or microprocessor controller 106, in accordance with an embodiment of the present invention.

In an example embodiment, a tape appliance 100 may be a tape drive. Tape appliance 100 may include several components providing control and data transfer system for reading and writing data on magnetic tape 150 that was received from host CPU 102.

Tape appliance 100 components may include a channel adapter 104, a computer, such as microprocessor controller 106, a data buffer 108, a read/write data flow circuit 112, a motion control system 110, and a tape interface system 114 that includes a motor driver circuit 116 and read/write heads 118.

Microprocessor controller 106 provides overall control functionality for the operations of all components of tape appliance 100. The functions performed by microprocessor controller 106 may be programmable via microcode routines according to desired tape drive operational characteristics.

For example, during data write operations, microprocessor controller 106 activates channel adapter 104 to perform the required host interface protocol for receiving an information data block. Channel adapter 104 communicates the data block to the data buffer 108 that stores the data for subsequent read/write processing. Data buffer 108 in turn communicates the data block received from channel adapter 104 to read/write dataflow circuitry 112, which formats the device data into physically formatted data that may be recorded on a magnetic tape medium 120.

A read/write dataflow circuitry 112 is responsible for executing all read/write data transfer operations under the control of microprocessor controller 106. Formatted physical data from read/write circuitry 112 is communicated to tape interface system 114.

A tape interface system 114 includes one or more read/write modules in read/write head unit 118, and drive motor components (not shown) for performing forward and reverse movement of a magnetic tape medium 120 mounted on a supply reel 122 and a take-up reel 124.

The drive components of tape interface system 114 are controlled by motion control system 110 and motor driver circuit 116 to execute tape movements such as forward and reverse recording and playback, rewind and other tape motion functions.

Figure 1B:
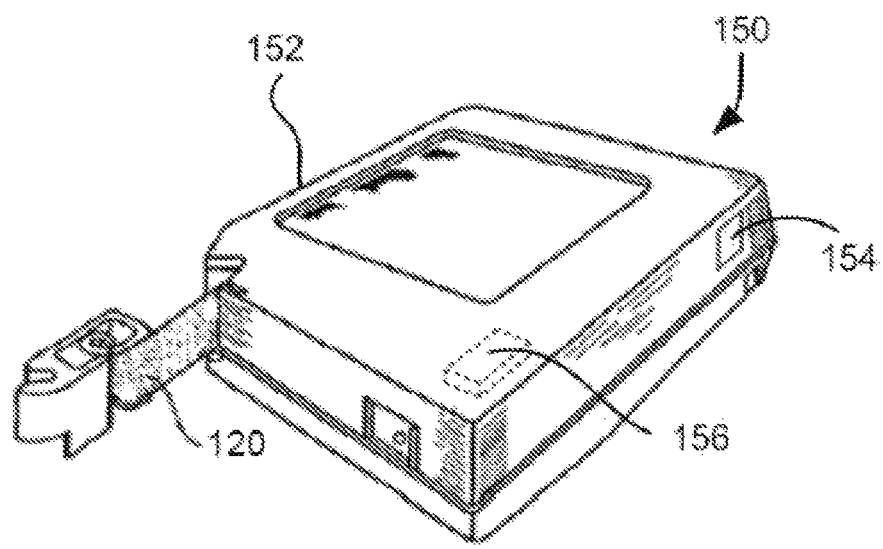
FIG. 1B illustrates an example tape cartridge, in accordance with an embodiment of the present invention.

Cartridge memory reader 126 interacts with nonvolatile memory of a tape cartridge, such as cartridge memory 156, as described in greater detail with relation to tape cartridge 150 of FIG. 1B.

According to an example embodiment, host CPU 102 may be a controller, a micro-controller, or a computer that receives and sends data to be written or read from magnetic tape medium 120. A host CPU 102 is connected to tape appliance 100 through channel adapter 104 and may run the SART program 101.

Host CPU 102 may be connected to tape appliance 100 by wired, wireless or a network connection. In other embodiments, the network connection may be an intranet, a local area network (LAN), or a wide area network (WAN).

The network may include, for example, wired, wireless (such as Wi-Fi, Bluetooth, or combined) or fiber optic connections. In other embodiments, network may be implemented as the Internet, representing a worldwide collection of networks and gateways to support communications between devices connected to the Internet or other type of network either wired or wireless which allows the communications between tape appliance 100 and host CPU 102. In general, network may be any combination of connections and protocols that will support communications between tape appliance 100 and host CPU 102.

The SART 101 is a software program that may be executed on host CPU 102 and determine an optimal location of the magnetic head on a tape in order to locate the requested data recorded on the tape in a shortest timeframe. According to an example embodiment, SART 101 may access a files index, read and analyze all the recorded locations of the files and based on converting the location of the files to LPOS, determine a location of the head on the magnetic tape in order to access all the recorded data in a shortest timeframe. Detailed description of SART 101 operations is described in FIG. 2 below.

FIG. 1B illustrates an example embodiment of a tape cartridge 150 according to an example embodiment. Tape cartridge 150 may be used with a system such as tape appliance 100 shown in FIG. 1A.

According to an example embodiment, tape cartridge 150 includes housing 152, magnetic tape medium 120 ("tape") in housing 152, and cartridge memory 156 coupled to housing 152. In other embodiments, cartridge memory 156 may be embedded inside housing 152. In further embodiments, cartridge memory 156 may be attached to the inside or outside of housing 152 without modification of housing 152.

According to an example embodiment, microprocessor controller 106 uses cartridge memory 156, via cartridge memory reader 126, as a temporary storage for information about data that is to be written in both running directions of magnetic tape medium 120, such as a generation value of an LTFS indexes. In further embodiments, cartridge memory 156 may store information regarding tape partitioning, and other information regarding using of the magnetic tape medium 120.

In an example embodiment, tape cartridge 150 meets the standard specifications of one or more of Linear Tape Open (LTO) generation standards, such as, for example, LTO-7. In such an embodiment, supply reel 122 may be integral to the LTO tape cartridge and connected to beginning of the tape 120A, and the end of tape 120B is connected to a leader pin (not shown) which is mechanically grasped by features (not shown) of tape interface system 114 and threaded onto take-up reel 124.

Figure 1C:
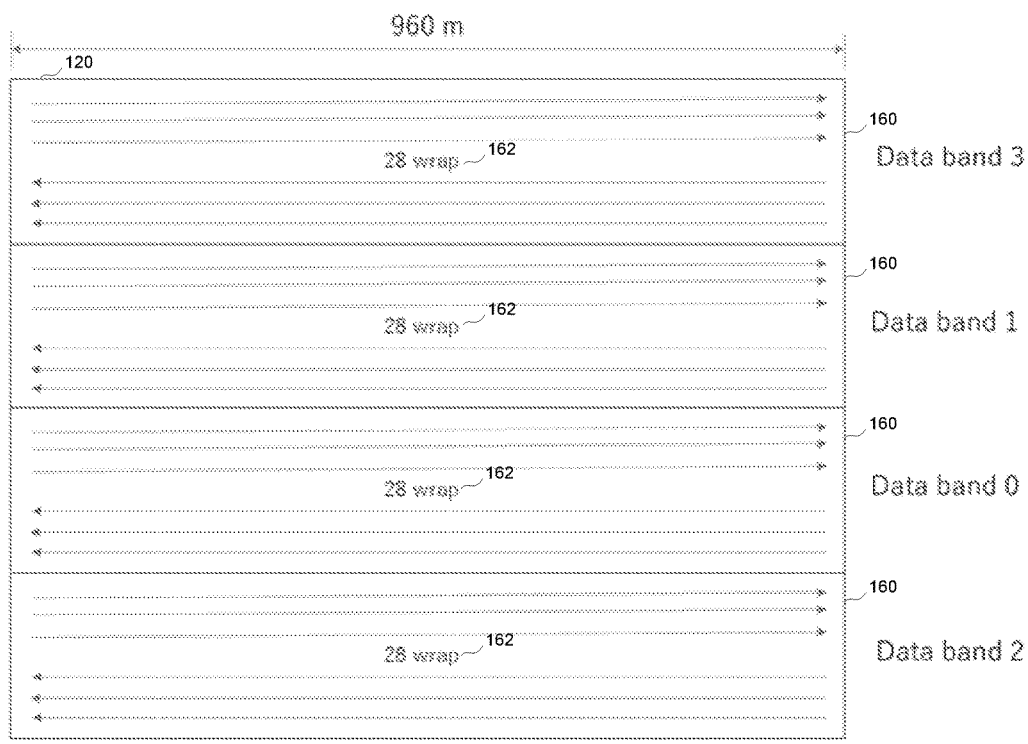
FIG. 1C illustrates an example of wrap allocation on the tape in LTFS format, in accordance with an embodiment of the present invention.

FIG. 1C illustrates an example embodiment of an LTFS magnetic tape medium 120 wrap allocation for the LTO-7. The magnetic tape medium 120, such as LTO-7, may have 112 wraps allocated to four data bands 160 (data bands 0-3) where each band has 28 wraps 162, where Data band 0 has wraps 0-27, Data band 1 has wraps 28-55, Data band 2 has wraps 56-83, and Data band 3 has wraps 84-111 respectively. All the data wraps may be formatted into a single partition from wrap 0 to wrap 111 or for example, LTFS may divide the tape into two partitions wraps 0-1 that may be used for metadata and wraps 4-111 for data retention associated with the metadata.

Figure 3:
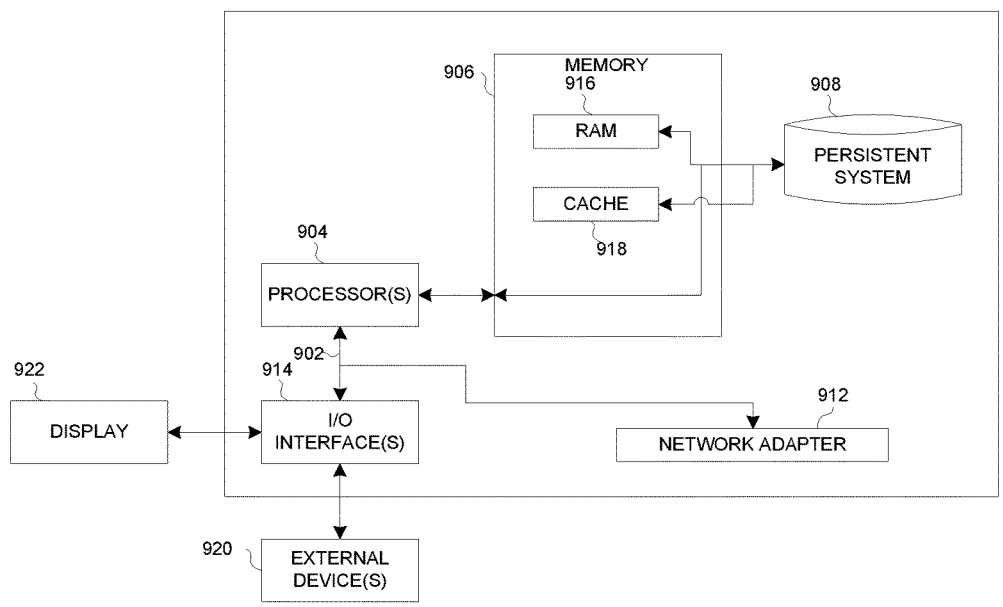
FIG. 3 is a block diagram depicting the example embodiment of hardware components of host CPU 102, and microprocessor controller 106, in accordance with an embodiment of the invention.

FIG. 1D illustrates an example of an index from the LTFS metadata record. Whenever tape cartridge 150 is mounted to tape appliance 100, an operating system on host CPU 102 reads the index from the LTFS data record and stores it in RAM 916 (FIG. 3). The index may include data identification 162 (i.e. file or folder), a file user identifier fileuid 164, file name 166, length of the data 168, attribute 170, timestamp 172, partition identification 174, start block 176, byte offset 178, byte count 180, file offset 182, and other metadata.

Figure 2:
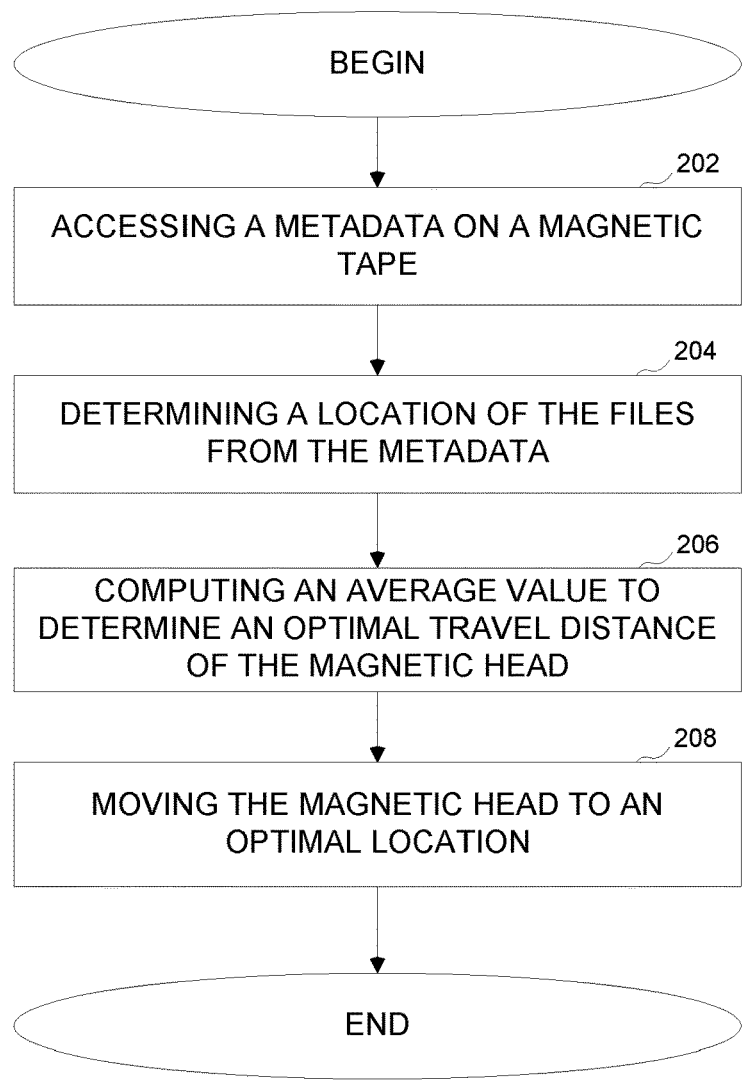
FIG. 2 is a flowchart of a shortening average reposition time (SART) program for determining and repositioning a magnetic head to an optimal location, in accordance with an embodiment of the present invention.

FIG. 2 is a flowcharts illustrating the operations of SART 101 program for determining and repositioning a magnetic head to an optimal location. According to an example embodiment, SART 101 may be a standalone or integrated software program running on host CPU 102, microprocessor controller 106, or integrated into operating system or device driver of tape appliance 100. In other embodiments SART 101 may be incorporated into LTFS software. The operations and functions of SART 101 program are described in further detail below with regard to FIG. 2.

Referring to step 202, SART 101 program accesses metadata on a magnetic tape. According to an example embodiment, after magnetic tape medium 120 is loaded into tape appliance 100, the metadata of the file system is read into the RAM 916 and may be accessed by the SART 101 program. For example, SART 101 program may access the metadata that is formatted in an LTFS data record format such as depicted in FIG. 1D.

Next in step 204, SART 101 program determines a location of the files from the metadata. According to an example embodiment, SART 101 program may access the index of each recorded file from the LTFS data record that may be read from the magnetic tape medium 120, RAM 916, or data buffer 108. For example, SART 101 program may determine the following fields of each recorded file or folder: fileuid 164, file name 166, length of the data 168, attribute 170, timestamp 172, partition identification 174, start block 176, byte offset 178, byte count 180, file offset 182. Based on the determined fields, such as start block 176, SART 101 program may determine or estimate, using a known technique, the position of each file such as, wrap number where each file is located, start LPOS and end LPOS of each file. Then, SART 101 program may arrange all the determined fields in a table or dataset as shown below in Table 1.

TABLE 1

Exemplary File Arrangement

| File name | Record number | Wrap | Start LPOS | End LPOS |
|---|---|---|---|---|
| file_001 | 10 | 4 (first wrap of data partition) | 570000 | 580000 |
| file_002 | 1000 | 4 | 580000 | 590000 |
| file_003 | 2000 | 4 | 590000 | 600000 |
| file_004 | 3000 | 4 | 600000 | 610000 |
| file_005 | 4000 | 4 | 610000 | 620000 |
| file_006 | 5000 | 4 | 620000 | 700000 |
| file_007 | 15000 | 4 | 700000 | 700000 |
| file_008 | 20000 | 5 (backward) | 700000 | 620000 |
| file_009 | 25000 | 5 | 620000 | 610000 |
| file_010 | 26000 | 5 | 610000 | 600000 |
| file_011 | 27000 | 5 | 600000 | 590000 |
| file_012 | 28000 | 5 | 590000 | 580000 |
| file_013 | 29000 | 5 | 580000 | 570000 |

TABLE 1-continued

Exemplary File Arrangement

| File name | Record number | Wrap | Start LPOS | End LPOS |
|---|---|---|---|---|
| file_014 | 30000 | 5 | 570000 | 580000 (wrap 6) |
| file_015 | 31000 | 6 (forward) | 580000 | 590000 |

Next in step 206, SART 101 program computes average values from all the recorded file locations to determine an optimal travel distance of the magnetic head. According to an example embodiment, SART 101 program may use the location of each recorded file from the index in order to calculate a location on the magnetic tape medium 120 that minimizes the timeframe to move the magnetic head to any file recorded on the magnetic tape medium 120.

The SART 101 program may calculate the average distance value from the current location x of the head using the following equation $$D_{avg}(x) = \frac{\sum_{i=1}^{n} |x - p_i|}{n}$$

where $D_{avg}(x)$ represents an average location from the beginning of the files, n represents a number of files in the index of the magnetic tape medium 120, $p_i$ represents a beginning of each file in LPOS (Start LPOS in Table 1) and by analyzing the distance x SART 101 program may determine the $x_{min}$ that minimizes the average travel distance $D_{avg}(x)$ to each one of the recorded files.

To continue previous example from Table 1, assuming that the Beginning Of Tape (BOT) position is 569,960 LPOS and End Of Tape (EOT) position is 738,454 LPOS, determined $x_{min}$=600,000 LPOS and $D_{avg}(x_{min})$=26,667 LPOS. For comparison, an average from the BOT location $D_{avg}$(BOT)=63,991 and $D_{avg}$(EOT)=38,222 LPOS. In order to show an improvement in timeframe to access a file on the magnetic tape medium 120 the tape speed of 1755 LPOS/sec is used (determined based on tape length 960 meters, (BOT–EOT)=168,494 and heads travel time 10 m/sec) and a summary is shown in Table 2 below.

TABLE 2

Comparing the Average Travel Times from the Respective LPOS Locations to the Beginning of the Files

| | Beginning of the Files | End of the Previous File | Minimum Travel Location ($x_{min}$) |
|---|---|---|---|
| Average LPOS Distance (LPOS) | 63991 | 38222 | 26667 |
| Travel Time (sec) | 36.46 | 21.78 | 15.19 |
| Difference from Travel Time from the Minimum Travel Location (sec) | −21.27 | −6.58 | N/A |
| Improvement Rate (%) | 58.3 | 30.2 | N/A |

As it may be apparent from Table 2 above, the timeframe required for the relocation of the read/write heads 118 has been improved by 58% compared with a case where the read/write heads 118 are to be relocated from the beginning of the files on the tape, and by 30% compared with a case where the head is to be relocated from a location immediately after the reading of the previous file.

In another embodiment, the optimal location of the read/write heads 118 may be determined by the SART 101 program while weighting the probabilities of previous file reading requests. In case where weighting is based on a number of times the file was previously accessed SART 101 program may determine $x_{min}$ where $D_{avg}(x)$ is at its minimum using a weighted equation $$D_{avg}(x) = \frac{\sum_{i=1}^{n}|x - p_i| \times (1 + a_i)}{n + \sum_{i=1}^{n} a_i}$$

where $a_i$ represents number of times the file i was accessed.

To continue our previous example from Table 1, Read Access table is added to represent a number of times each file was accessed in Table 3 below.

TABLE 3

Example of Weighted Files Arrangement based on an Access Frequencies

| Filename | Record number | Wrap | Start LPOS | End LPOS | Read Access |
|---|---|---|---|---|---|
| file_001 | 10 | 4(first wrap of data partition) | 570000 | 580000 | 3 |
| file_002 | 1000 | 4 | 580000 | 590000 | 0 |
| file_003 | 2000 | 4 | 590000 | 600000 | 2 |
| file_004 | 3000 | 4 | 600000 | 610000 | 1 |
| file_005 | 4000 | 4 | 610000 | 620000 | 1 |
| file_006 | 5000 | 4 | 620000 | 700000 | 1 |
| file_007 | 15000 | 4 | 700000 | 700000 | 0 |
| file_008 | 20000 | 5(backward) | 700000 | 620000 | 0 |
| file_009 | 25000 | 5 | 620000 | 610000 | 0 |
| file_010 | 26000 | 5 | 610000 | 600000 | 2 |
| file_011 | 27000 | 5 | 600000 | 590000 | 4 |
| file_012 | 28000 | 5 | 590000 | 580000 | 3 |
| file_013 | 29000 | 5 | 580000 | 570000 | 4 |
| file_014 | 30000 | 5 | 570000 | 580000 (wrap 6) | 2 |
| file_015 | 31000 | 6 (forward) | 580000 | 590000 | 0 |

After applying the weighted equation, the physical location $x_{min}$ where $D_{avg}(x)$ is at the minimum is 590,000 LPOS and to the beginning of the files $D_{avg}(X)$=19,238 LPOS.

As may be seen from the Table 4 below, after calculating average travel times from the $x_{min}$ location compared to the beginning of the files the average calculated improvement in the access times is 72.6%.

TABLE 4

Comparison of the Average Travel Times While Taking Into Account File Access Frequencies

|  | Location | End of File | Minimum Travel Location without Weighting | Minimum Travel Location (Proposed) |
|---|---|---|---|---|
| Average LPOS Distance (LPOS) | 66345 | 35281 | 19211 | 18158 |
| Travel Time (sec) | 37.80 | 20.10 | 10.95 | 10.34 |
| Difference from Travel Time from the Minimum Travel Location (sec) | −27.46 | −9.76 | 0.61 | N/A |
| Improvement Rate (%) | 72.6 | 48.5 | 5.6 | N/A |

In further embodiments, weighting maybe based on frequencies of access to files in the index, weighting based on EOD location in the case of appending new files to the index, not moving the head from the EOD location if additional file is to be written on the tape, weighting based on the size of the files, and increasing the weighting of files that are expected to be streamed.

Next in step 208, SART 101 program moves the magnetic head to an optimal location. According to an example embodiment, SART 101 program may relocate the read/write heads 118 to the previously determined $x_{min}$ in instances when there is no further request for reading or writing to the tape for a period of time. For example, SART 101 program may reposition the read/write heads 118 to $x_{min}$ after idling for a predetermined lapse of time (i.e. 5 minutes).

FIG. 3 depicts a block diagram of components, such as host CPU 102, microprocessor controller 106 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A host CPU 102, and microprocessor controller 106 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The SART 101 program may be stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The SART 101 program may be downloaded to persistent storage 908 through communications unit 912.

The I/O interface(s) 914 allows for input and output of data with other devices that may be connected to host CPU 102, microprocessor controller 106. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., SART 101 program may be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a computer-readable storage device, tangible storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for shortening a reposition time of a head on a magnetic tape, the method comprising:
   accessing metadata on a file system of the magnetic tape, wherein the metadata comprising one or more fields enabling to determine a longitudinal position (LPOS) of one or more files located on the magnetic tape;
   determining the LPOS of the one or more files located on the magnetic tape;
   determining an optimal location of the head on the magnetic tape based on computing an average travel distance to the determined LPOS of the one or more files located on the magnetic tape; and
   relocating the head on the magnetic tape to the optimal location.

2. The method of claim 1, wherein accessing metadata on a file system of the magnetic tape comprises accessing an index of each one of the one or more files in a linear tape file system (LTFS).

3. The method of claim 2, wherein determining the LPOS of the one or more files located on the magnetic tape comprises determining a beginning of each one of the one or more files located on the magnetic tape based on converting a start block and a length of a data to the LPOS.

4. The method of claim 3, wherein determining an optimal location of the head on the magnetic tape based on computing an average travel distance to the determined LPOS of the one or more files located on the magnetic tape further comprises:
   calculating the travel distance value based on an equation $$D_{avg}(x) = \frac{\sum_{i=1}^{n} |x - p_i|}{n},$$

wherein n represents a number of the one or more files, and wherein $p_i$ represents the beginning of each one of the one or more files located on the magnetic tape in LPOS; and
   analyzing locations x on the magnetic tape and determining an $x_{min}$ based on the average travel distance $D_{avg}(x)$.

5. The method of claim 4, wherein relocating the head on the magnetic tape to the optimal location further comprises relocating the magnetic tape to the $x_{min}$ based on determining no access a file request was received for more than predetermined timeframe.

6. The method of claim 3, wherein determining an optimal location of the head on the magnetic tape based on computing an average travel distance to the determined LPOS of the one or more files located on the magnetic tape further comprises:
   determining one or more weights based on a number of times each one of the one or more files were previously accessed;
   calculating the average travel distance based on an equation $$D_{avg}(x) = \frac{\sum_{i=1}^{n} |x - p_i| \times (1 + a_i)}{n + \sum_{i=1}^{n} a_i},$$

wherein $a_i$ represents the one or more weights, wherein n represents a number of the one or more files, and wherein $p_i$ represents the beginning of each one of the one or more files located on the magnetic tape in LPOS; and
   analyzing locations x on the magnetic tape and determining an $x_{min}$ based on the average travel distance $D_{avg}(x)$.

7. The method of claim 6, wherein relocating the head on the magnetic tape to the optimal location further comprises relocating the magnetic tape to the $x_{min}$ based on determining no access a file request was received for more than predetermined timeframe.

8. A computer system for shortening a reposition time of a head on a magnetic tape, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   accessing metadata on a file system of the magnetic tape, wherein the metadata comprising one or more fields enabling to determine a longitudinal position (LPOS) of one or more files located on the magnetic tape;
   determining the LPOS of the one or more files located on the magnetic tape;
   determining an optimal location of the head on the magnetic tape based on computing an average travel distance to the determined LPOS of the one or more files located on the magnetic tape; and
   relocating the head on the magnetic tape to the optimal location.

9. The computer system of claim 8, wherein accessing metadata on a file system of the magnetic tape comprises accessing an index of each one of the one or more files in a linear tape file system (LTFS).

10. The computer system of claim 9, wherein determining the LPOS of the one or more files located on the magnetic tape comprises determining a beginning of each one of the one or more files located on the magnetic tape based on converting a start block and a length of a data to the LPOS.

11. The computer system of claim 10, wherein determining an optimal location of the head on the magnetic tape based on computing an average travel distance to the determined LPOS of the one or more files located on the magnetic tape further comprises:

calculating the travel distance value based on an equation $$D_{avg}(x) = \frac{\sum_{i=1}^{n}|x - p_i|}{n},$$

wherein n represents a number of the one or more files, and wherein $p_i$ represents the beginning of each one of the one or more files located on the magnetic tape in LPOS; and analyzing locations x on the magnetic tape and determining an $x_{min}$ based on the average travel distance $D_{avg}(x)$.

12. The computer system of claim 11, wherein relocating the head on the magnetic tape to the optimal location further comprises relocating the magnetic tape to the $x_{min}$ based on determining no access a file request was received for more than predetermined timeframe.

13. The computer system of claim 10, wherein determining an optimal location of the head on the magnetic tape based on computing an average travel distance to the determined LPOS of the one or more files located on the magnetic tape further comprises:

determining one or more weights based on a number of times each one of the one or more files were previously accessed;

calculating the average travel distance based on an equation $$D_{avg}(x) = \frac{\sum_{i=1}^{n}|x - p_i| \times (1 + a_i)}{n + \sum_{i=1}^{n} a_i},$$

wherein $a_i$ represents the one or more weights, wherein n represents a number of the one or more files, and wherein $p_i$ represents the beginning of each one of the one or more files located on the magnetic tape in LPOS; and analyzing locations x on the magnetic tape and determining an $x_{min}$ based on the average travel distance $D_{avg}(x)$.

14. The computer system of claim 13, wherein relocating the head on the magnetic tape to the optimal location further comprises relocating the magnetic tape to the $x_{min}$ based on determining no access a file request was received for more than predetermined timeframe.

15. A computer program product for shortening a reposition time of a head on a magnetic tape, the computer program product comprising:

one or more computer-readable tangible storage medium and program instructions stored on at least one of the one or more tangible storage medium, the program instructions executable by a processor, the program instructions comprising:

program instructions to access metadata on a file system of the magnetic tape, wherein the metadata comprising one or more fields enabling to determine a longitudinal position (LPOS) of one or more files located on the magnetic tape;

program instructions to determine the LPOS of the one or more files located on the magnetic tape;

program instructions to determine an optimal location of the head on the magnetic tape based on program instructions to compute an average travel distance to the determined LPOS of the one or more files located on the magnetic tape; and program instructions to relocate the head on the magnetic tape to the optimal location.

16. The computer program product of claim 15, wherein program instructions to access metadata on a file system of the magnetic tape comprises program instructions to access an index of each one of the one or more files in a linear tape file system (LTFS).

17. The computer program product of claim 16, wherein program instructions to determine the LPOS of the one or more files located on the magnetic tape comprises program instructions to determine a beginning of each one of the one or more files located on the magnetic tape based on program instructions to convert a start block and a length of a data to the LPOS.

18. The computer program product of claim 17, wherein program instructions to determine an optimal location of the head on the magnetic tape based on program instructions to compute an average travel distance to the determined LPOS of the one or more files located on the magnetic tape further comprises:

program instructions to calculate the travel distance value based on an equation $$D_{avg}(x) = \frac{\sum_{i=1}^{n}|x - p_i|}{n},$$

wherein n represents a number of the one or more files, and wherein $p_i$ represents the beginning of each one of the one or more files located on the magnetic tape in LPOS; and program instructions to analyze locations x on the magnetic tape and program instructions to determine an $x_{min}$ based on the average travel distance $D_{avg}(x)$.

19. The computer program product of claim 18, wherein program instructions to relocate the head on the magnetic tape to the optimal location further comprises relocating the magnetic tape to the $x_{min}$ based on determining no access a file request was received for more than predetermined timeframe.

20. The computer program product of claim 17, wherein program instructions to determine an optimal location of the head on the magnetic tape based on program instructions to compute an average travel distance to the determined LPOS of the one or more files located on the magnetic tape further comprises:

program instructions to determine one or more weights based on a number of times each one of the one or more files were previously accessed;

program instructions to calculate the average travel distance based on an equation $$D_{avg}(x) = \frac{\sum_{i=1}^{n}|x - p_i| \times (1 + a_i)}{n + \sum_{i=1}^{n} a_i},$$

wherein $a_i$ represents the one or more weights, wherein n represents a number of the one or more files, and wherein $p_i$ represents the beginning of each one of the one or more files located on the magnetic tape in LPOS; and program instructions to analyze locations x on the magnetic tape and program instructions to determine an $x_{min}$ based on the average travel distance $D_{avg}(x)$.

* * * * *